US010212591B1

(12) United States Patent
Queru

(10) Patent No.: US 10,212,591 B1
(45) Date of Patent: Feb. 19, 2019

(54) AUTHENTICATION BASED ON PROXIMITY TO MOBILE DEVICE

(71) Applicant: Google LLC, Mountain View, CA (US)

(72) Inventor: Jean Baptiste Maurice Queru, Foster City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/677,112

(22) Filed: Aug. 15, 2017

Related U.S. Application Data

(63) Continuation of application No. 14/731,915, filed on Jun. 5, 2015, now Pat. No. 9,769,662, which is a continuation of application No. 13/487,745, filed on Jun. 4, 2012, now Pat. No. 9,075,979.

(60) Provisional application No. 61/522,352, filed on Aug. 11, 2011.

(51) Int. Cl.
| H04L 29/06 | (2006.01) |
| H04W 12/06 | (2009.01) |
| H04W 64/00 | (2009.01) |
| H04W 4/80 | (2018.01) |

(52) U.S. Cl.
CPC .......... *H04W 12/06* (2013.01); *H04L 63/105* (2013.01); *H04W 4/80* (2018.02); *H04W 64/00* (2013.01)

(58) Field of Classification Search
None
See application file for complete search history.

(56) References Cited

U.S. PATENT DOCUMENTS

| 5,463,768 | A | 10/1995 | Cuddihy et al. |
| 5,655,081 | A | 8/1997 | Bonnell et al. |
| 5,778,444 | A | 7/1998 | Langan et al. |
| 5,794,224 | A | 8/1998 | Yufik |
| 6,148,368 | A | 11/2000 | Dekoning |
| 6,178,482 | B1 | 1/2001 | Sollars |
| 6,449,671 | B1 | 9/2002 | Patkar et al. |
| 6,490,651 | B1 | 12/2002 | Shats |
| 6,505,211 | B1 | 1/2003 | Dessloch et al. |
| 6,505,248 | B1 | 1/2003 | Casper et al. |
| 6,587,866 | B1 | 7/2003 | Modi et al. |
| 6,598,179 | B1 | 7/2003 | Chirashnya et al. |
| 6,643,613 | B2 | 11/2003 | McGee et al. |
| 6,829,678 | B1 | 12/2004 | Sawdon et al. |
| 6,891,839 | B2 | 5/2005 | Albert et al. |

(Continued)

FOREIGN PATENT DOCUMENTS

WO 2011095516 8/2011

OTHER PUBLICATIONS

"Advisory Action", U.S. Appl. No. 13/487,745, dated Feb. 27, 2013, 3 pages.

(Continued)

*Primary Examiner* — William J. Goodchild
(74) *Attorney, Agent, or Firm* — Colby Nipper

(57) ABSTRACT

Methods, systems, and apparatus, including computer programs encoded on a computer storage medium, for performing multi-factor authentication. In one aspect, a method includes determining that a user has successfully completed an authentication factor, determining whether a mobile device associated with the user is proximate to a computer; and authenticating the user based on determining that the user has successfully completed the authentication factor, and that the mobile device is proximate to the computer.

20 Claims, 5 Drawing Sheets

(56) References Cited

U.S. PATENT DOCUMENTS

| | | |
|---|---|---|
| 6,898,697 B1 | 5/2005 | Gao et al. |
| 6,996,502 B2 | 2/2006 | De La Cruz et al. |
| 7,043,455 B1 | 5/2006 | Cuomo et al. |
| 7,062,718 B2 | 6/2006 | Kodosky et al. |
| 7,117,243 B2 | 10/2006 | Peart |
| 7,356,679 B1 | 4/2008 | Le et al. |
| 7,466,703 B1 | 12/2008 | Arunachalam et al. |
| 7,478,388 B1 | 1/2009 | Chen et al. |
| 7,500,262 B1 | 3/2009 | Sanin et al. |
| 7,529,836 B1 | 5/2009 | Bolen |
| 7,584,467 B2 | 9/2009 | Wickham et al. |
| 7,596,620 B1 | 9/2009 | Colton et al. |
| 7,600,676 B1 | 10/2009 | Rados et al. |
| 7,650,331 B1 | 1/2010 | Dean et al. |
| 7,653,833 B1 | 1/2010 | Miller et al. |
| 7,761,573 B2 | 7/2010 | Travostino et al. |
| 7,804,862 B1 | 9/2010 | Olson et al. |
| 7,836,285 B2 | 11/2010 | Giri et al. |
| 7,979,899 B2 | 7/2011 | Guo et al. |
| 8,051,414 B2 | 11/2011 | Stender et al. |
| 8,065,717 B2 | 11/2011 | Band |
| 8,103,771 B2 | 1/2012 | Tanaka et al. |
| 8,108,903 B2 | 1/2012 | Norefors et al. |
| 8,127,295 B1 | 2/2012 | Jones et al. |
| 8,146,147 B2 | 3/2012 | Litvin et al. |
| 8,219,777 B2 | 7/2012 | Jacobson et al. |
| 8,261,295 B1 | 9/2012 | Risbood et al. |
| 8,276,140 B1 | 9/2012 | Beda et al. |
| 8,286,227 B1 | 10/2012 | Zheng |
| 8,296,459 B1 | 10/2012 | Brandwine et al. |
| 8,307,406 B1 | 11/2012 | Aboujaoude et al. |
| 8,468,535 B1 | 6/2013 | Keagy et al. |
| 8,484,353 B1 | 7/2013 | Johnson et al. |
| 8,504,844 B2 | 8/2013 | Browning |
| 8,533,796 B1 | 9/2013 | Shenoy et al. |
| 8,601,602 B1 | 12/2013 | Zheng |
| 8,621,005 B2 | 12/2013 | Boyd et al. |
| 9,075,979 B1 | 7/2015 | Queru |
| 9,769,662 B1 | 9/2017 | Queru |
| 2002/0091902 A1 | 7/2002 | Hirofuji |
| 2002/0097747 A1 | 7/2002 | Kirkby et al. |
| 2003/0046589 A1 | 3/2003 | Gregg et al. |
| 2004/0014423 A1* | 1/2004 | Croome ............... H04L 63/08 455/41.2 |
| 2004/0068637 A1 | 4/2004 | Nelson et al. |
| 2004/0139368 A1 | 7/2004 | Austen et al. |
| 2004/0148484 A1 | 7/2004 | Watanabe et al. |
| 2004/0203595 A1* | 10/2004 | Singhal ............... G06Q 20/32 455/411 |
| 2004/0210653 A1 | 10/2004 | Kanoor et al. |
| 2005/0010715 A1 | 1/2005 | Davies et al. |
| 2005/0044393 A1 | 2/2005 | Holdsworth |
| 2005/0166011 A1 | 7/2005 | Burnett et al. |
| 2005/0196030 A1 | 9/2005 | Schofield et al. |
| 2005/0216659 A1 | 9/2005 | Ogawa et al. |
| 2005/0237543 A1 | 10/2005 | Kikuchi |
| 2005/0268107 A1* | 12/2005 | Harris ................. G06F 21/31 713/182 |
| 2005/0269401 A1* | 12/2005 | Spitzer ............... G06Q 20/32 235/380 |
| 2005/0289499 A1 | 12/2005 | Ogawa et al. |
| 2006/0026354 A1 | 2/2006 | Lesot et al. |
| 2006/0048077 A1 | 3/2006 | Boyles et al. |
| 2006/0048130 A1 | 3/2006 | Napier et al. |
| 2006/0059228 A1 | 3/2006 | Kasamsetty et al. |
| 2006/0067236 A1 | 3/2006 | Gupta |
| 2006/0075199 A1 | 4/2006 | Kallahalla et al. |
| 2006/0083208 A1* | 4/2006 | Lin ..................... H04W 76/11 370/338 |
| 2006/0098618 A1 | 5/2006 | Bouffioux |
| 2006/0136676 A1 | 6/2006 | Park et al. |
| 2006/0153099 A1 | 7/2006 | Feldman et al. |
| 2006/0161753 A1 | 7/2006 | Aschoff et al. |
| 2006/0235795 A1 | 10/2006 | Johnson et al. |
| 2006/0271547 A1 | 11/2006 | Chen et al. |
| 2007/0011361 A1 | 1/2007 | Okada et al. |
| 2007/0061590 A1 | 3/2007 | Boye et al. |
| 2007/0112956 A1 | 5/2007 | Chapman et al. |
| 2007/0118694 A1 | 5/2007 | Watanabe et al. |
| 2007/0123276 A1 | 5/2007 | Parker et al. |
| 2007/0177198 A1 | 8/2007 | Miyata |
| 2007/0199058 A1 | 8/2007 | Baumgart et al. |
| 2007/0271604 A1 | 11/2007 | Webster et al. |
| 2007/0280243 A1 | 12/2007 | Way et al. |
| 2007/0288921 A1 | 12/2007 | King et al. |
| 2008/0028389 A1 | 1/2008 | Genty et al. |
| 2008/0086515 A1 | 4/2008 | Bai et al. |
| 2008/0095176 A1 | 4/2008 | Ong et al. |
| 2008/0107112 A1 | 5/2008 | Kuo et al. |
| 2008/0205415 A1 | 8/2008 | Morales |
| 2008/0208681 A1 | 8/2008 | Hammad et al. |
| 2008/0215796 A1 | 9/2008 | Lam et al. |
| 2008/0222246 A1 | 9/2008 | Ebling et al. |
| 2008/0222375 A1 | 9/2008 | Kotsovinos et al. |
| 2008/0244030 A1 | 10/2008 | Leitheiser |
| 2008/0244471 A1 | 10/2008 | Killian et al. |
| 2008/0250147 A1* | 10/2008 | Knibbeler ........... H04L 63/0492 709/229 |
| 2008/0250407 A1 | 10/2008 | Dadhia et al. |
| 2008/0270704 A1 | 10/2008 | He et al. |
| 2008/0289030 A1* | 11/2008 | Poplett .................. G06F 21/31 726/15 |
| 2008/0304516 A1 | 12/2008 | Feng et al. |
| 2008/0307258 A1 | 12/2008 | Challenger et al. |
| 2008/0310324 A1 | 12/2008 | Chaponniere |
| 2009/0025074 A1 | 1/2009 | Le Saint et al. |
| 2009/0097657 A1 | 4/2009 | Scheidt et al. |
| 2009/0150629 A1 | 6/2009 | Noguchi et al. |
| 2009/0199177 A1 | 8/2009 | Edwards et al. |
| 2009/0222815 A1 | 9/2009 | Dake |
| 2009/0235358 A1 | 9/2009 | Tolba |
| 2009/0240744 A1 | 9/2009 | Thomson et al. |
| 2009/0241108 A1 | 9/2009 | Edwards et al. |
| 2009/0249440 A1 | 10/2009 | Platt et al. |
| 2009/0276771 A1 | 11/2009 | Nickolov et al. |
| 2009/0282266 A1 | 11/2009 | Fries et al. |
| 2009/0300605 A1 | 12/2009 | Edwards et al. |
| 2009/0300641 A1 | 12/2009 | Friedman et al. |
| 2009/0310554 A1 | 12/2009 | Sun et al. |
| 2010/0017859 A1 | 1/2010 | Kelly et al. |
| 2010/0023582 A1 | 1/2010 | Pedersen et al. |
| 2010/0031345 A1* | 2/2010 | Sinclair ................ G06F 21/34 726/19 |
| 2010/0046426 A1 | 2/2010 | Shenoy et al. |
| 2010/0057913 A1 | 3/2010 | DeHaan |
| 2010/0063895 A1 | 3/2010 | Dominguez et al. |
| 2010/0071035 A1 | 3/2010 | Budko et al. |
| 2010/0088335 A1 | 4/2010 | Mimatsu |
| 2010/0095000 A1 | 4/2010 | Kettler et al. |
| 2010/0199089 A1 | 8/2010 | Vysogorets et al. |
| 2010/0212004 A1 | 8/2010 | Fu |
| 2010/0215050 A1 | 8/2010 | Kanada |
| 2010/0217927 A1 | 8/2010 | Song et al. |
| 2010/0235649 A1 | 9/2010 | Jeffries et al. |
| 2010/0274984 A1 | 10/2010 | Inomata et al. |
| 2010/0287548 A1 | 11/2010 | Zhou et al. |
| 2010/0293285 A1 | 11/2010 | Oishi et al. |
| 2010/0293601 A1* | 11/2010 | Schultz ................ G06F 21/604 726/4 |
| 2010/0303241 A1 | 12/2010 | Breyel |
| 2010/0317323 A1* | 12/2010 | Facemire ........... H04L 63/0492 455/411 |
| 2011/0010483 A1 | 1/2011 | Liljeberg |
| 2011/0022812 A1 | 1/2011 | Linden et al. |
| 2011/0055361 A1 | 3/2011 | Dehaan |
| 2011/0060882 A1 | 3/2011 | Efstathopoulos |
| 2011/0078363 A1 | 3/2011 | Yeh et al. |
| 2011/0085563 A1 | 4/2011 | Kotha et al. |
| 2011/0103389 A1 | 5/2011 | Kidambi et al. |
| 2011/0153697 A1 | 6/2011 | Nickolov et al. |
| 2011/0153838 A1 | 6/2011 | Belkine et al. |
| 2011/0179412 A1 | 7/2011 | Nakae et al. |
| 2011/0191485 A1 | 8/2011 | Umbehocker |

(56) References Cited

U.S. PATENT DOCUMENTS

| | | |
|---|---|---|
| 2011/0191768 A1 | 8/2011 | Smith |
| 2011/0197024 A1 | 8/2011 | Thomas |
| 2011/0231280 A1 | 9/2011 | Farah |
| 2011/0246767 A1 | 10/2011 | Chaturvedi et al. |
| 2011/0258441 A1 | 10/2011 | Ashok et al. |
| 2011/0296157 A1 | 12/2011 | Konetski et al. |
| 2011/0302400 A1 | 12/2011 | Maino et al. |
| 2011/0302415 A1 | 12/2011 | Ahmad et al. |
| 2012/0060018 A1 | 3/2012 | Shinde et al. |
| 2012/0063458 A1 | 3/2012 | Klink et al. |
| 2012/0066749 A1 | 3/2012 | Taugbol et al. |
| 2012/0084570 A1 | 4/2012 | Kuzin et al. |
| 2012/0084768 A1 | 4/2012 | Ashok et al. |
| 2012/0089981 A1 | 4/2012 | Tripathi |
| 2012/0159634 A1 | 6/2012 | Haikney et al. |
| 2012/0173866 A1 | 7/2012 | Ashok et al. |
| 2012/0179796 A1 | 7/2012 | Nagaraj et al. |
| 2012/0185688 A1 | 7/2012 | Thornton et al. |
| 2012/0191912 A1 | 7/2012 | Kadatch et al. |
| 2012/0215050 A1 | 8/2012 | Hu |
| 2012/0233678 A1 | 9/2012 | Pal |
| 2012/0233705 A1 | 9/2012 | Boysen et al. |
| 2012/0246637 A1 | 9/2012 | Kreeger et al. |
| 2012/0266159 A1 | 10/2012 | Risbood et al. |
| 2013/0074181 A1 | 3/2013 | Slngh |
| 2013/0081014 A1 | 3/2013 | Kadatch et al. |
| 2013/0117801 A1 | 5/2013 | Shieh et al. |
| 2013/0212709 A1 | 8/2013 | Tucker |
| 2013/0227303 A1 | 8/2013 | Kadatch et al. |
| 2013/0262405 A1 | 10/2013 | Kadatch et al. |
| 2013/0276068 A1 | 10/2013 | Alwar |

OTHER PUBLICATIONS

"Amazon Auto Scaling—Developer Guide—API Version Aug. 1, 2010", Amazon Web Services LLC, 2011, 62 pages.
"Amazon Auto Scaling—Getting Started Guide—API Version Aug. 1, 2010", Amazon Web Services LLC, 2010, 20 pages.
"Amazon CloudWatch—Developer Guide—API Version Aug. 1, 2010", Amazon Web Services LLC, 2010, 75 pages.
"Amazon Elastic Compute Cloud, User Guide, API Version Mar. 1, 2012", Retrieved from the Internet: http://docs.amazonwebservices.com/AWSEC2/latest/UserGuide/AESDG-chapter-instancedata.html?r=4276 on Mar. 18, 2012, 7 pages.
"Amazon S3—The Beginner's Guide", Retrieved from the Internet: http://www.hongkiat.com/blog/amazon-s3-the-beginners-guide/ on Apr. 26, 2011, 9 pages.
"Anycast", Retrieved from the Internet: http://en.wikipedia.org/wiki/Anycast on Oct. 10, 2011, 5 pages.
"Apache HTTP Server Version 2.0. "Log Files."", Retrieved from the Internet: http://httpd.apache.org/docs/2.0/logs.html on Feb. 15, 2011, 7 pages.
"API Documentation-Oauth", Retrieved from the Internet: http://gowalla.com/api/docs/oauth on Apr. 26, 2011, 4 pages.
"Deployment and Configuration of Component-based Distributed Applications Specification—Version 4.0", OMG, 2006, 2006, 160 pages.
"Domain Name System", Retrieved from the Internet: http://en.wikipedia.org/wiki/Domain_Name_System on Feb. 4, 2014, 13 pages.
"Final Office Action", U.S. Appl. No. 13/487,745, dated Jan. 15, 2013, 10 pages.
"Final Office Action", U.S. Appl. No. 13/487,745, dated Dec. 19, 2014, 10 pages.
"Generic Routing Encapsulation", Creative Commons Attribution—Share Alike 3.0 Unported Retrieved from the Internet: http://creativecommons.org/licenses/by-sa/3.0/ on Jan. 14, 2011, 5 pages.
"How to view and manage event logs in Event Viewer in Windows XP", Retrieved from the Internet: http://support.microsoft.com/kb/308427 on Feb. 15, 2011, May 7, 2007, 6 pages.

"IPSec", Retrieved from the Internet: http://en.wikipedia.org/wiki/IPsec/ on Jan. 4, 2011, 8 pages.
"Key Management in Cloud Datacenters", Stackexchange.com Retrieved from the Internet: http://security.stackexchange.com/questions/2514/key-management-in-cloud-datacenters on Nov. 18, 2011, 2 pages.
"Managing Amazon EC2—SSH Login and Protecting Your Instances", Everyday's Findings Retrieved from the Internet: http://blog.taggesell.de/index.php?/aarchives/73-Managing-Amazon-EC2 on Nov. 18, 2011, May 18, 2009, 6 pages.
"Monitoring Linux/Unix Machines", Retrieved from the Internet: http://nagios.sourceforge.net/docs/3 0/monitoring-linux.html on Feb. 3, 2011, 2011, 1 page.
"Nagios Plugins", Retrieved from the Internet: http://nagios.sourceforge.net/docs/3_0/plugins.html on Feb. 3, 2011, 2011, 2 pages.
"Non-Final Office Action", U.S. Appl. No. 13/487,745, dated Aug. 9, 2012, 15 pages.
"Non-Final Office Action", U.S. Appl. No. 14/731,915, dated Feb. 1, 2017, 9 pages.
"Non-Final Office Action", U.S. Appl. No. 13/487,745, dated Aug. 4, 2014, 9 pages.
"Notice of Allowance", U.S. Appl. No. 13/249,329, dated Jun. 12, 2012, 21 pages.
"Notice of Allowance", U.S. Appl. No. 14/731,915, dated May 19, 2017, 7 pages.
"Notice of Allowance", U.S. Appl. No. 13/487,745, dated Mar. 11, 2015, 9 pages.
"OAuth", Retrieved from the Internet: http://en.wikipedia.org/wiki/OAuth on Jan. 20, 2011, 3 pages.
"Office Action", U.S. Appl. No. 13/613,841, dated Mar. 12, 2014, 17 pages.
"Office Action", U.S. Appl. No. 12/872,111, dated Feb. 28, 2013, 20 pages.
"Office Action", U.S. Appl. No. 12/872,111, dated Aug. 14, 2012, 25 pages.
"Office Action", U.S. Appl. No. 13/249,329, dated Dec. 29, 2011, 33 pages.
"Paravirtualization", Retrieved from the Internet: http://en.wikipedia.org/wiki/Paravirtualization on Mar. 18, 2012.
"PKCS #11 v2.20: Cryptographic Token Interface Standard", RSA Laboratories, RSA Security Inc., Jun. 28, 2004, 407 pages.
"Storage I/0 Control Technical Overview and Consideration for Deployment VMware vSphere TM 4.1", XP05504491 Retrieved from the internet: http://www.vmware.com/fled/pdf/techpaper/WMW-vSphere4I-SIOC.pdf on Nov. 21, 2012, Jan. 1, 2010.
"Using and Managing AWS—Part 6: SSH Key Pairs", Top WordPress Retrieved from the Internet: http://clouddb.info/2009/05/26/using-and-managing-aws-part-6-ssh-key-pairs, May 26, 2009, 5 pages.
"Visual Basic Concepts, Visual Studio 6.0: Centralized Error Handling", Retrieved from the Internet: http://msdn.microsoft.com/en-us/library/aa240795(d=printer, v=vs.60).aspx on Feb. 15, 2011, 4 pages.
"VMCI Datagram API", Retrieved from the Internet: http://pubs.vmware.com/vmci-sdk/datagram.html on Jun. 8, 2011, 1 page.
"VMCI Datagram_SendTo", Retrieved from the Internet: http://pubs.vmware.com/vmci-sdk/functionsNMCIDatagram_SendTo.html on Jun. 8, 2011, 1 page.
"VMCI Overview", Retrieved from the Internet: http://pubs.vmware.com/vmci-sdk/VMCI_intro.html on Jun. 8, 2011, 3 pages.
"VMCIDs _ Lookup", Retrieved from the Internet: http://pubs.vmware.com/vmci-sdk/functions/VMCIDs_Lookup.html on Jun. 8, 2011, 2 pages.
"VMware vSphere", Retrieved from the Internet: http://www.vmware.com/products/vmotion/overview.html on Jun. 8, 2011, 2 pages.
"What is my AWS Access and Secret Key.", Retrieved from the Internet: http://www.bucketexplorer.com/documentation/amazon-s3--what-is-my-aws-access-and-secret-key.html on Apr. 26, 2011, 1 page.
"Zabbix 1.8: The Ultimate Open Source Monitoring Solution", Retrieved from the Internet: http://www.zabbix.com/features.php on Feb. 3, 2011, 2001-2012, 1 page.

(56) References Cited

OTHER PUBLICATIONS

Abdull, Alastairirvine, et al., "Generic Routing Encapsulation", Retrieved from the Internet: http://creativecommons.org/licenses/by-sa/3.0/ on Jan. 4, 2011, 5 pages.
Alpern, B "The Jalapeno virtual machine", IBM Systems Journal, Jan. 2000, vol. 39, Issue 1, pp. 211-238, Jan. 2000, 28 pages.
Benincosa, "Ganglia and Nagios, Part 2: Monitor enterprise clusters with Nagios-Install Nagios to effectively monitor a data center; make Ganglia and Nagios work together", 2009, 20 pages.
Benson, , et al., "Location-Aware Authentication and Access Control—Concepts and Issues", 2009 International Conference on Advanced Information Networking and Applications, 2009, pp. 10-15, 2009, 6 pages.
Bok, Jin Y. "International Search Report and Written Opinion for PCT/US2012/029210", Authorized Officer for Korean Intellectual Property Office, dated Oct. 10, 2012, 9 pages.
Cabellos, et al., "LISPmob: Mobile Networking through LISP", Apr. 2, 2012, 8 pages.
Cala, et al., "Automatic Software Deployment in the Azure Cloud", IFIP International Federation for Information Processing, 2010, 2010, 14 pages.
Chen, Per M. , et al., "Maximizing Performance in a Striped Disk Array", 17th Annual International Symposium on Computer Architecture (SIGARCH 1990), 18 pages.
Eng, Lili "Examiner's First Report for 2012200562", Australian Government, IP Australia, Jun. 4, 2012, 2 pages.
Farinacci, et al., "RFC 2784: Generic Routing Encapsulation (GRE)", The Internet Society, Mar. 2000, 10 pages.
Gagne, Marcel "Cloud Computing Course, Part 2: Amazon's EC2", Retrieved from the Internet: http://marcelgagne.com/content/cloud-computing-course-part-2-amazons-ec2, Jun. 13, 2011, 6 pages.
Gommans, L , et al., "Token-Based Authorization of Connection Oriented Network Resources", 1st International Workshop on Networks for Grid Applications (GridNets 2004), Oct. 29, 2004, 8 pages.
Hammond, Eric "Uploading Personal ssh Keys to Amazon EC2", Retrieved from the Internet: http://alestic.com/2010/I0/ec2-ssh-keys, Oct. 14, 2010, 3 pages.
Hehn, Eva "International Search Report and Written Opinion for PCT/US2013/027456", Authorized Office for European Patent Office, dated Jun. 24, 2013, 11 pages.
Hensbergen, Eric V. "Paravirtualized File Systems", Retrieved from the Internet: http://www.slideshare.net/ericvh/9p-on-kvm on Mar. 18, 2012.
Hyun, Ahn J. "International Search Report and Written Opinion for PCT/US2012/021846", Authorized Officer for Korean Intellectual Property Office, dated May 25, 2012, 8 pages.
Jansen, , et al., "Proximity-based Authentication for Mobile Devices", Proceedings of the 2005 International Conference on Security and Management, pp. 398-404, Jun. 20, 2005, Jun. 20, 2005, 7 pages.
Jaros, , et al., "A New Approach in a Multifactor Authentication and Location-based Authorization", ICIMP 2011: The Sixth International Conference on Internet Monitoring and Protection, pp. 50-53, Mar. 20, 2011, Mar. 20, 2011, 4 pages.
Kent, , et al., "RFC 4301: Security Architecture for the Internet Protocol", The Internet Society, Dec. 2005, 102 pages.
Laitinen, Aapo, et al., "Network Address Translation", Retrieved from the Internet: http://en.wikipedia.org/wiki/Networkpages _Address_ and _Port_ Translation on Oct. 10, 2011, 11 pages.
Moller, Jan, et al., "Internal Network Security", Retrieved from the Internet: http://www.daimi.au.dk/~fwiffo/thesis/, Feb. 1, 2000-May 18, 2001, 183 pages.
Myerson, Judith "Creating Applications with Amazon EC2 and S3", Retrieved from the Internet: http://onlamp.com/pub/a/onlamp/2008/05/13/creating-appli cations-with-amazon-ec2-and-s3.html on Apr. 26, 2011, May 13, 2008, 8 pages.
Na, Lee D. "International Search Report and Written Opinion for PCT/US2012/020954", Authorized Officer for Korean Intellectual Property Office, dated Aug. 23, 2012, 10 pages.
Primet, Pascale, et al., "HIPCAL: State of the Art of OS and Network virtualization solutions for Grids", Sep. 14, 2007, 38 pages.
Sarhan, Nabil J. , et al., "Caching and Scheduling in NAD-Based Multimedia Servers", IEEE Computer Society, IEEE Transactions on Parallel and Distributed Systems, vol. 15, No. 10, Oct. 2004; pp. 921-933, Oct. 2004, 13 pages.
Stamatiou, Paul "How To: Getting Started With Amazon EC2", Retrieved from the Internet: http//paulstamatiou.com/how-to-getting-started-with-amazon-ec2, Apr. 5, 2008, 25 pages.
Steinmetz, Christof "International Search Report and Written Opinion for PCT/US2013/034140", Authorized Office for European Patent Office, dated Jun. 25, 2013, 21 pages.
Travostino, Franco , et al., "Seamless Live Migration of Virtual Machines over the MAN/WAN", Elsevier Future Generation Computer Systems 2006, 2006, 10 pages.
Vazhkudai, Sudharshan S., et al., "Constructing Collaborative Desktop Storage Caches for Large Scientific Datasets", ACM Journal Name, vol. V, No. N, Jun. 2006, Jun. 2006, 34 pages.

\* cited by examiner

FIG. 2

AUTHENTICATION BASED ON PROXIMITY TO MOBILE DEVICE

CROSS-REFERENCE TO RELATED APPLICATION

This application is a continuation of U.S. application Ser. No. 14/731,915, filed on Jun. 5, 2015, which is a continuation of U.S. application Ser. No. 13/487,745, filed on Jun. 4, 2012, which claims the benefit of priority of U.S. Application Ser. No. 61/522,352, filed on Aug. 11, 2011. The contents of each of these applications are incorporated herein by reference.

TECHNICAL FIELD

This specification relates to multi-factor authentication.

BACKGROUND

Multi-factor authentication is a security protocol that requires a user to confirm their identity using more than one authentication technique. Using two-factor authentication, for example, the identity of the user can be authenticated based both on something that the user knows, such as the password to a user account, and something that the user has, such as a security token.

SUMMARY

In general, one innovative aspect of the subject matter described in this specification can be embodied in processes for authenticating the user of a computer systems, using an enhanced multi-factor authentication protocol. Under this enhanced protocol, one of the authentication factors can be satisfied when a mobile device belonging to the user is determined to be physically co-located with, or proximate to, the computer system which the user is attempting access.

Co-location with, or proximity to, the mobile device may be evidenced by geo-location information associated with the mobile device and the computer system, or may be based on the existence of a short-range connection between the mobile device and the computer system. Because the user of a mobile device may carry their mobile devices on their person throughout the course of their day, authentication based on the proximity to the mobile device may enhance the security of the user's authentication, without requiring the user to provide additional information, to carry additional security tokens, or to otherwise interact with the computer system or the mobile device.

In general, another innovative aspect of the subject matter described in this specification can be embodied in processes that include the actions of determining that a user has successfully completed an authentication factor, determining whether a mobile device associated with the user is proximate to a computer; and authenticating the user based on determining that the user has successfully completed the authentication factor, and that the mobile device is proximate to the computer.

Other embodiments of these aspects include corresponding systems, apparatus, and computer programs, configured to perform the actions of the methods, encoded on computer storage devices.

In some embodiments, determining that the mobile device associated with the user is proximate to the computer includes determining a location of the mobile device, determining a location of the computer, and determining that a distance between the location of the mobile device and the location of the computer is within a predetermined threshold; determining that the mobile device associated with the user is proximate to the computer includes determining the existence of a connection between the mobile device and the computer; the actions include determining, in response to determining that the mobile device is not proximate to the computer, that the user has successfully completed an additional authentication factor, and authenticating the user based on determining that the user has successfully completed both the authentication factor and the additional authentication factor; determining that the user has successfully completed the authentication factor includes determining that the user has successfully completed an authentication factor for gaining access to the computer; determining that the user has successfully completed the authentication factor includes determining that the user has successfully completed an authentication factor through interaction with the computer; the actions include associating the mobile device with the user, prior to determining whether the mobile device associated with the user is proximate to the computer, wherein the association is formed through user interaction with the mobile device; the actions include associating the mobile device with the user, prior to determining whether the mobile device associated with the user is proximate to the computer, wherein the association is formed through user interaction with the computer; and/or the actions include determining that the mobile device can no longer be used to authenticate any user prior to determining whether the mobile device associated with the user is proximate to the computer, and eliminating the association between the mobile device and the user.

Particular implementations of the subject matter described in this specification can be implemented so as to realize one or more of the following advantages. A user can be authenticated by merely possessing the mobile device proximate to the computer. In particular, the user need not execute an application on the mobile device or enter an access code either into the mobile device or the computer system. The mobile device and the computer system can exchange information wirelessly, negating any hard-wire connections. The mobile device need not be physically modified to prove the existence of a connection. The mobile device need be configured only once. Subsequently, it can be used as an authentication factor multiple times without requiring any physical connections or data input.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates a user interface for receiving information to associate a mobile device with a user.

DETAILED DESCRIPTION

Figure 1A:
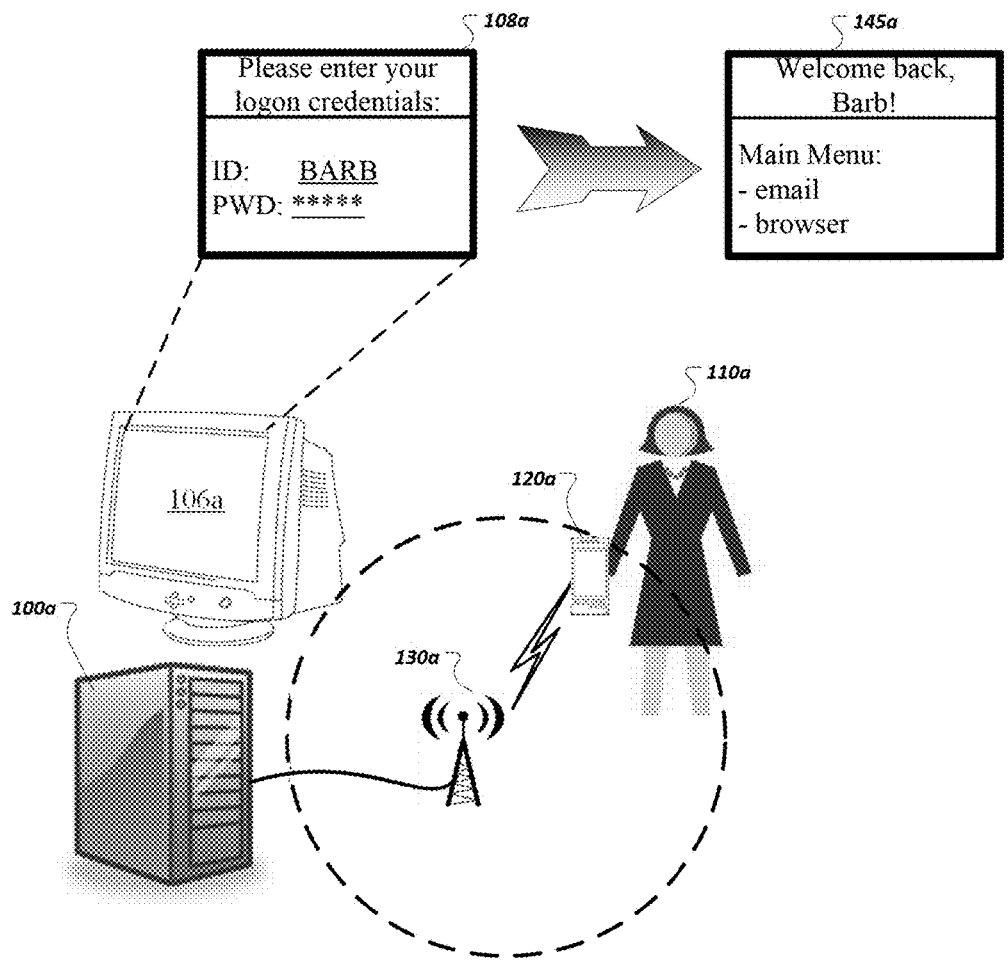
FIGS. 1A and 1B illustrate systems that implement multi-factor authentication using a device proximity-based authentication factor.
Figure 1B:
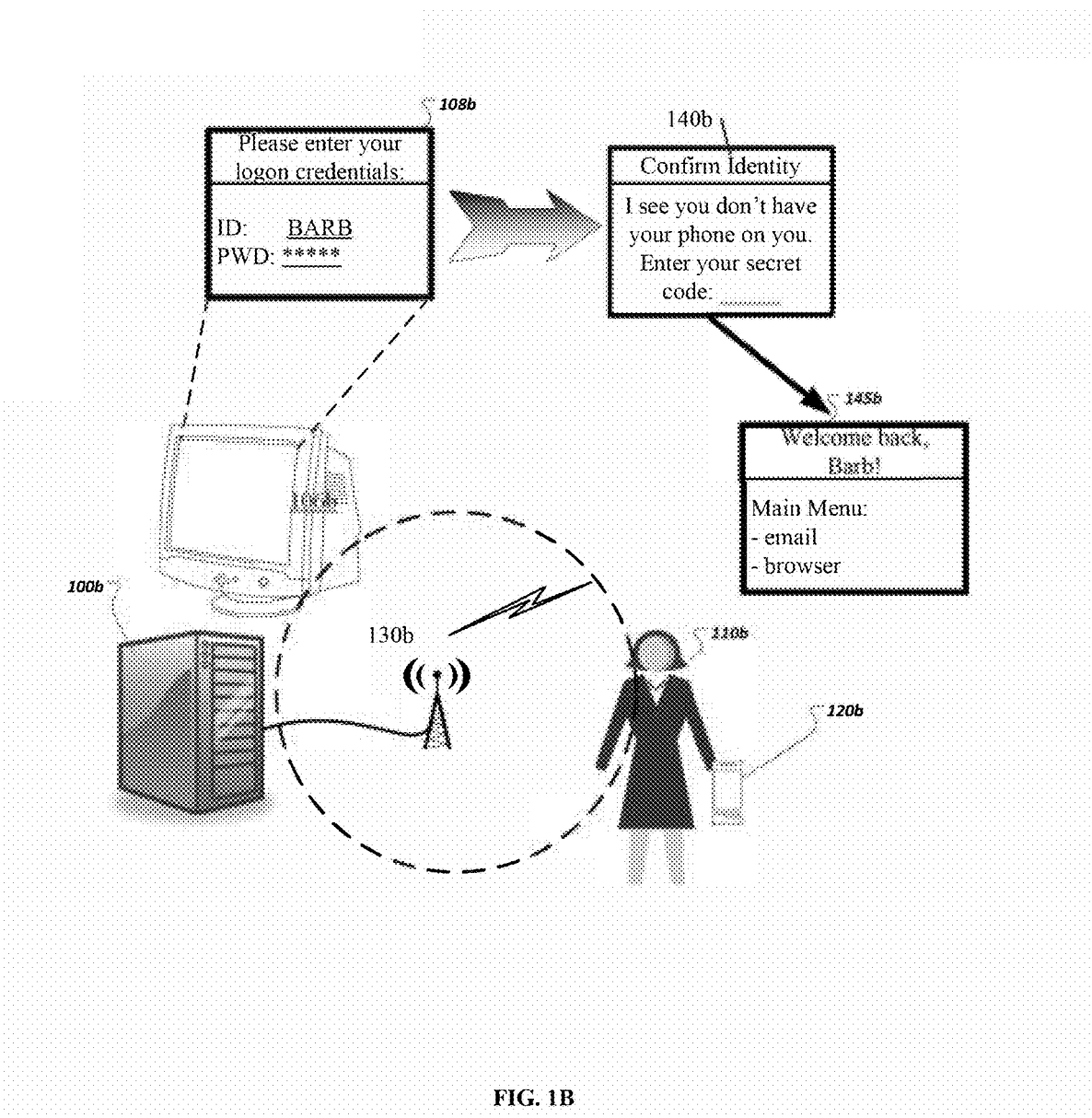

FIGS. 1A and 1B illustrate systems that implement multi-factor authentication using a device proximity-based authentication factor. In FIG. 1A, a computer system 100a authenticates a user 110a, who is attempting to access the computer system 100a. The computer system 100a authenticates users using multi-factor authentication, at least one factor of which is performed in coordination with a mobile device 120a.

The computer system 100a can include one or more processors and a computer-readable storage medium storing one or more computer program instructions executable by the one or more processors. The mobile device 120a can include, among other components, one or more processors (not shown) that execute computer applications. The mobile device 120a can be, for example, a personal digital assistant (PDA), a smart phone, a navigation system, a music player, tablet computer, e-book reader, a key fob, or any other type of computing device. Each of the computer system 100a and the mobile device 120a can be configured to perform particular operations or actions by virtue of having software, firmware, hardware, or a combination of them installed on each of them, which causes each of them to perform the actions.

The computer-readable storage medium of the computer system 100a stores computer software programs executable by the one or more processors to authenticate the user 110a. The user 110a is authenticated based on the user 110a successfully completing a multiple authentication factors, including an authentication factor that determines whether the mobile device 120 is proximate to the computer system 100a. Once the user is authenticated, the computer system 100a grants the user access to information, stored on the computer system 100a or accessible through the computer system 100a or both.

To determine that the user 110a has successfully completed the first authentication factor, the computer system 100a can implement a computer software application in which the computer system 100a that requests the user 110a to perform an action to gain access to the computer system 100a. If the computer system 100a determines that the user 110a has failed to successfully perform the requested action, then the computer system 100a determines that the user 110a has failed to successfully complete the first authentication factor, and denies the user 110a access to the computer system 100a.

In some implementations, to request the user 110a to perform the action, the computer system 110a can display a user interface 108 in a display device 106a coupled to the computer system 100a, and can request that the user 110a provide a user identifier (ID) and a password (PWD) in the user interface 108a. The user 110a may have previously created and stored a user account on the computer system 100a. When the computer system 100a determines that the password received in the user interface 108a is correct (for example, matches the stored password associated with the user account of the user 110a), the computer system 100a determines that the first authentication factor has been successfully completed. Thus, the first authentication factor may be based on something that the user has knowledge of, namely, the password.

After the user 110a has successfully completed the first authentication factor by interacting with the computer system 100a, the system 100a can implement a second authentication factor that may be satisfied through the user's possession of the mobile device 120a. For example, the computer system 100a can determine whether the mobile device 120a associated with the user 110a is proximate to the computer system 100a.

Once the computer 100a has determined (i) that the user 110a has successfully completed the authentication factor, and (ii) that the mobile device 120a is proximate to the computer, the user 110a may be considered to be successfully authenticated. In such a situation, the computer system 100a can grant the user 110a access to the computer system 100a.

The mobile device 120a and the computer system 100a can be configured to exchange information, for example, wirelessly, when in physical proximity to each other. As described below with reference to FIG. 2, the user 110a can pair the mobile device 120a and the computer system 100a in a one-time operation, following which the computer system 100 can automatically recognize the mobile device 120a.

Once the mobile device 120a and the computer system 100a are paired, the user 110a can successfully complete the second authentication factor by merely possessing the mobile device 120a when in physical proximity to the computer system 100. In particular, the user 110a need not modify the mobile device 120a, or manually invoke an application using the mobile device 120a, or receive a code on the mobile device 120a and provide the code to the computer system 100a, or provide any type of input to or using the mobile device 120a, or even touch the mobile device 120a during the authentication process, to successfully complete the corresponding authentication factor.

In some implementations, to determine physical proximity, the computer system 100 can determine whether a distance between the mobile device 120a and a reference location satisfies a threshold. The reference location can be the location of the computer system 100a or can alternatively be the location of a transceiver 130a that is coupled to the computer system 100a through a wireless or wireline connection. In some implementations, the transceiver 130a can be integrated into the computer system 100a, and, in others, can be separate from the system 100a.

The computer system 100a can determine whether the mobile device 120a is within a threshold distance from the reference location based on the existence of a connection between the mobile device 120a. For example, the mobile device 120a and the computer system 100a can be paired by a Bluetooth connection. Such pairing may be possible only when the mobile device 120a is within the threshold distance from the computer system 100a. When the mobile device 120a is positioned outside the pre-defined distance location, then the Bluetooth connection cannot be established and consequently the threshold cannot be satisfied.

Upon determining that the password received through the user interface 108a is correct, the computer system 100a (or the transceiver 130a) can scan for Bluetooth compatible devices within a distance from the computer system 100a. The distance can be the range of the Bluetooth signal that the computer system 100a transmits. Beyond the range, the Bluetooth signal may be too weak to establish a connection.

When the mobile device 120a, which is Bluetooth compatible and was previously paired with the computer system 100a, is within this distance, the mobile device 120a can receive the signal and, in turn, can transmit signals to identify itself to the computer system 100a. Upon receiving the signals that the mobile device 120a transmits, the computer system 100a can determine that the mobile device 120a is proximate to the computer, and consequently that the second authentication factor has been successfully completed.

In another example, the computer system 100a can additionally determine whether the distance between the mobile device 120a and the reference location satisfies the threshold based on strength of the connection. For example, the computer system 100a can transmit a signal and a request that the mobile device 120a acknowledge receipt of the transmitted signal. The computer system 100a can be configured to determine a time taken for an acknowledgement signal to be received.

The mobile device 120a can include a transceiver configured to receive the signal that the computer system 100a transmits and to transmit an acknowledgement signal in return. When a time in which the computer system 100a receives the acknowledgement signal from the mobile device 120a satisfies a reference time threshold, the computer system 100a determines that the mobile device 120a is within a threshold distance from the computer system 100a, and that the second authentication factor has been successfully completed.

In some implementations, the computer system 100a can determine that the mobile device 120a associated with the user 110a is proximate to the computer system 100a by determining a location of the mobile device 120a, determining a location of the computer system 100a (or the reference location), and determining that a distance between the location of the mobile device and the location of the computer system 100a is within a predetermined threshold distance.

For example, the computer system 100a can receive its location and the location of the mobile device 120a from a position tracking system (such as, a Global Positioning System, or through WiFi triangulation). In general, the position tracking system can be any system that can determine locations with fine granularity, such that a difference between an actual location of an object and a determined location of the object is negligible (for example, of the order of one meter or a foot or less). In some implementations, the position tracking system can provide the location of the mobile device 120a and that of the computer system 100a to a different system (for example, a centralized server). The computer system 100a (or the centralized server) can determine that the distance between the two locations is within the predetermined threshold.

The computer system 100 can alternatively determine whether the mobile device 120a is within a threshold distance from the computer system 100a based on a difference between times registered by respective atomic clocks connected to each of the mobile device 120a and the computer system 100a. In metrology, one meter is defined as the length of the path traveled by light in vacuum in a pre-defined fraction of a second. The pre-defined fraction can be determined using an atomic clock. The computer system 100a can determine a distance between the mobile device 120a and the computer system 100a based on a time difference registered by the respective atomic clocks.

By implementing the techniques described above with reference to FIG. 1A, the computer system 100a determines that the mobile device 120a is proximate to the system 100a. Thus, the computer system 100a determines that the user 110a has successfully completed the second authentication factor based on something that the user 110a has, i.e., the mobile device 120a. Therefore, the computer system 100 successfully authenticates and grants the user 110a access, for example, to a computer software application 145a executing on the computer system 100a.

In FIG. 1B a computer system 100b authenticates a user 110b, who is attempting to access the computer system 100b. The computer system 100b authenticates users using multi-factor authentication, during which an attempt is made to perform at least one authentication factor in coordination with a mobile device 120b. Specifically, the computer system 100b requires a successful completion of a third authentication factor because the authentication factor implemented in the mobile device 120b was not successfully completed.

In FIG. 1B, the computer system 100b does not detect the presence of the mobile device 120b within the threshold distance from the reference location (i.e., the computer system 100b or the transceiver 130b). More particularly, the computer system 100b implements a computer software application in which the computer system 100b requests the user 110b to perform an action to gain access to the computer system 100b.

For example, the computer system 100b requests that the user 110b provide a correct password through the user interface 108b. The computer system 100b determines that the requested action was successfully performed, for example, because the computer system 100b determines that the password received through the user interface 108b matches a previously created password associated with a user account of user 110b. Therefore, the computer system 100b determines that the user 110b successfully completed the first authentication factor.

However, the computer system 100b determines that a mobile device 120b, which is required for authenticating the user, is not proximate to the computer system 100b. For example, the computer system 100b scans for Bluetooth compatible devices, particularly, for the mobile device 120b with which the computer system 100b was previously paired. Because the mobile device 120b is outside the range of the Bluetooth signal, the mobile device 120b cannot transmit signals to identify itself to the computer system 100b.

In another example, the computer system 100b transmits a signal and a request to acknowledge the signal. In one scenario, the mobile device 120b does not receive the request to acknowledge the signal and does not transmit an acknowledgement signal. In another scenario, the mobile device 100b is beyond proximity of the computer system 100b such that a time taken for the computer system 100b to receive the acknowledgement signal that the mobile device 120b transmits does not satisfy the reference time threshold.

Alternatively, or in addition, the computer system 100b can determine that the distance between the mobile device 120b and the computer system 100b is greater than the distance threshold by comparing the position information (for example, GPS information) describing its own position and the position of the mobile device 120b. Because the mobile device 120b is not proximate to the computer system 100b, the system 100b determines that a second authentication factor was not successfully completed. This can lead to two implications—the user 110b is an unauthorized user who does not have access to the computer system 100b, or the user is an otherwise authorized user who happens not to possess the mobile device 120b at that time.

In some implementations, the computer system 100b can deny the user 110b access to the computer software application 145b. In other words, the computer system 100b determines that the absence of the mobile device 120b is a strong implication that an unauthorized user is attempting to access the computer system 100b.

In other implementations, the user 110b may have forgotten the mobile device 120b at a different location, such as the user's home. In such situations, rather than denying the user 110 access to the computer system 100b, the system 100b can present the user 110b with an additional authentication factor and allow the user 110b to establish authenticity.

At least a portion of the additional authentication factor can be implemented in the mobile device 120b. In some implementations, the computer system 100 can determine if the mobile device 120 is within a pre-defined geographic area. When pairing the mobile device 120b and the computer system 100b, the user 110b may have specified the geographic area, for example, the city, state, or country in which the user 110b resides. The computer system 100 can receive location formation, for example, Global Positioning System (GPS) information from the mobile device 120b (such as a latitude/longitude pair) and determine whether the mobile device 120b is within the pre-defined geographic area.

If the computer system 100b determines that the mobile device 120b is within the pre-defined geographic area, then the computer system 100b can display a user interface 140b to the user 110b, and request the user to provide additional information to confirm the user's identity, such as through the use of a one-time password (OTP). Thus, if the computer system 100b determines that the mobile device 120b is within the pre-defined geographic area and the user provides correct identifying information in the user interface 140b, then the computer system 100b can determine that the user 110b is authorized and can grant access to the computer software application 145b. Unless both conditions are satisfied, the computer system 100b may not grant the user 110b access.

In this manner, in response to determining that the user 110b has successfully completed the first authentication factor and that the user 110b has not successfully completed the second authentication factor because the mobile device 120b is not proximate to the computer, the computer system 100b can require that the user 110b successfully complete an additional authentication factor. To do so, the one or more processors can execute computer software instructions stored on the computer-readable storage medium to implement a computer software application which requests additional information from the user 110b (for example, an additional password that the user 110b previously stored on the computer-readable storage medium).

When the computer system 100b determines that the additional information received, for example, through the user interface 140b, is correct, the computer system 100b determines that the user has successfully completed the additional authentication factor. Because the computer system 100b determines that the user has successfully completed both the first authentication factor and the additional authentication factor, the computer system 100b can authenticate the user 110b even though the mobile device 120b is not proximate to the computer.

Figure 2:
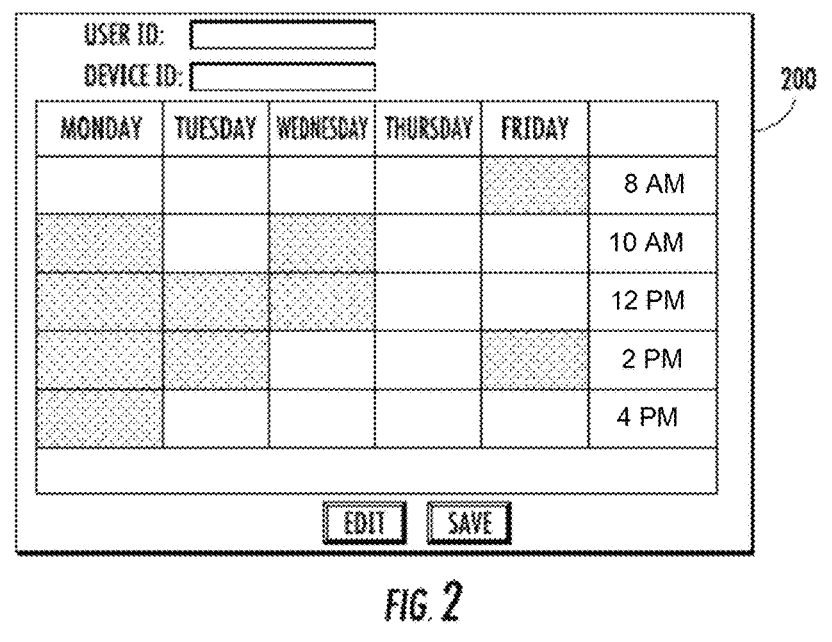

FIG. 2 illustrates a user interface 200 for receiving information to associate a mobile device with a user. In some implementations, prior to determining whether the mobile device associated with the user is proximate to the computer system, the system can associate the mobile device with the user. The user can associate the mobile device and the computer system by providing information describing the mobile device in the user interface 200. The information can include, for example, a device identifier and a make/model of the device. In addition, the information can include time frames, for example, days of the week or times of the day (or combinations of them), within which the mobile device can be used as an authentication factor.

In some implementations, the association can be formed through user interaction with the computer system. For example, the computer system can display the user interface 200 in a display device coupled to the computer system through which the user can provide the association information. In some implementations, the computer system 200 can implement a Bluetooth pairing application to identify all Bluetooth-compatible devices, including the mobile device, which are within a range of the Bluetooth signal, and display the identified devices in the user interface 200. The user can select the mobile device from among the identified devices.

In some implementations, the association can be formed through user interaction with the mobile device. For example, the mobile device can display the user interface 200 in a display section of the mobile device. The user can interact with the user interface 200 to provide the association information. In alternative implementations, the association can be formed through user interactions with both the mobile device and the computer system.

In some implementations, the computer system can determine that the mobile device can no longer be used to authenticate any user prior to determining whether the mobile device associated with the user is proximate to the computer. For example, an authorized user may have reported that a mobile device, previously associated with the computer system as described above, has been lost. Subsequently, when the computer system detects an authentication attempt using the lost mobile device, then the computer system can deny access. Further, the computer system can eliminate the association between the mobile device and the user.

Figure 3:
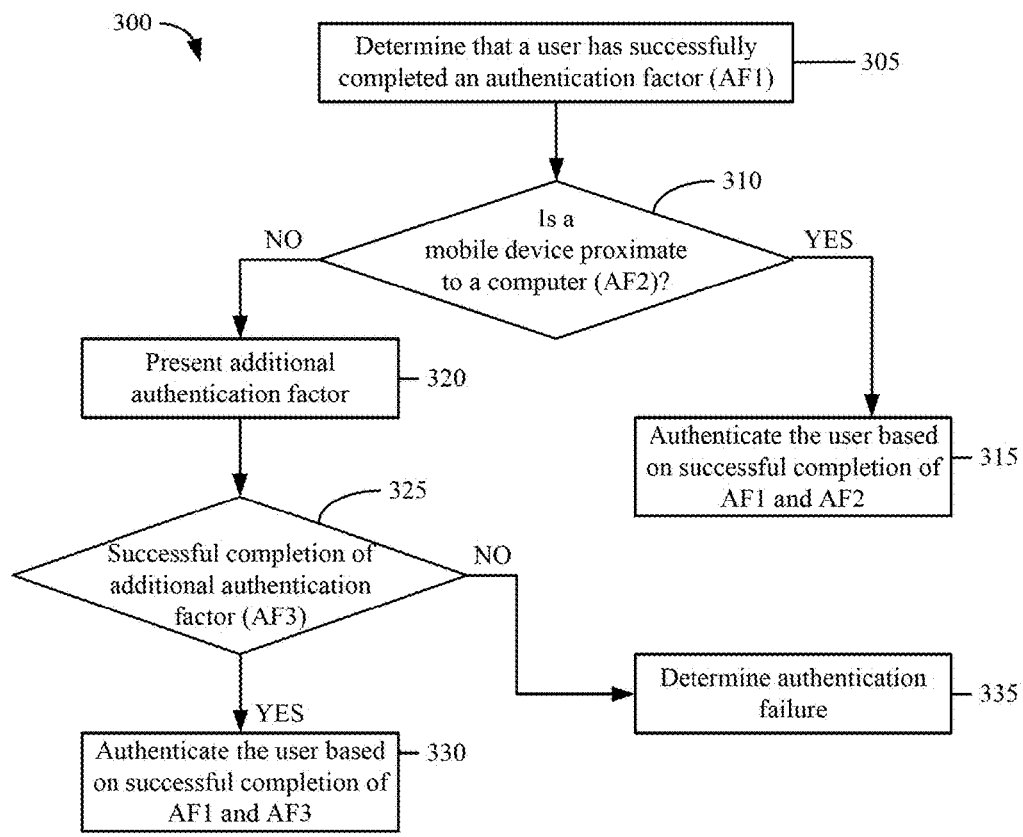
FIG. 3 is a flowchart of an example multi-factor authentication process.

FIG. 3 is a flowchart of an example multi-factor authentication process 300. Briefly, the process 300, which be implemented as one or more computer programs that can be configured to perform particular operations or actions by virtue of including instructions that, when executed by data processing apparatus, cause the apparatus to perform the actions of determining that a user has successfully completed an authentication factor (AF1) at 305. The process 300 can check if a mobile device is proximate to a computer (AF2) at 310. If the mobile device is proximate to the computer (decision branch "YES"), then the process 300 can authenticate the user based on successful completion of the authentication factor and based on determining that the mobile device is proximate to the computer at 315.

If, on the other hand, the mobile device is not proximate to the computer (decision branch "NO"), then the process 300 can present an additional authentication factor at 320. As described above, the additional authentication factor can include determining whether the mobile device is within a pre-defined geographic area and receiving additional authentication information from the user. The process 300 can check for successful completion of the additional authentication factor (AF3) at 325. If the additional authentication factor has been successfully completed (decision branch "YES"), then the process 300 can authenticate the user based on successful completion of AF1 and AF3 at 330. If not (decision branch "NO"), then the process 300 can determine authentication failure at 335.

Figure 4:
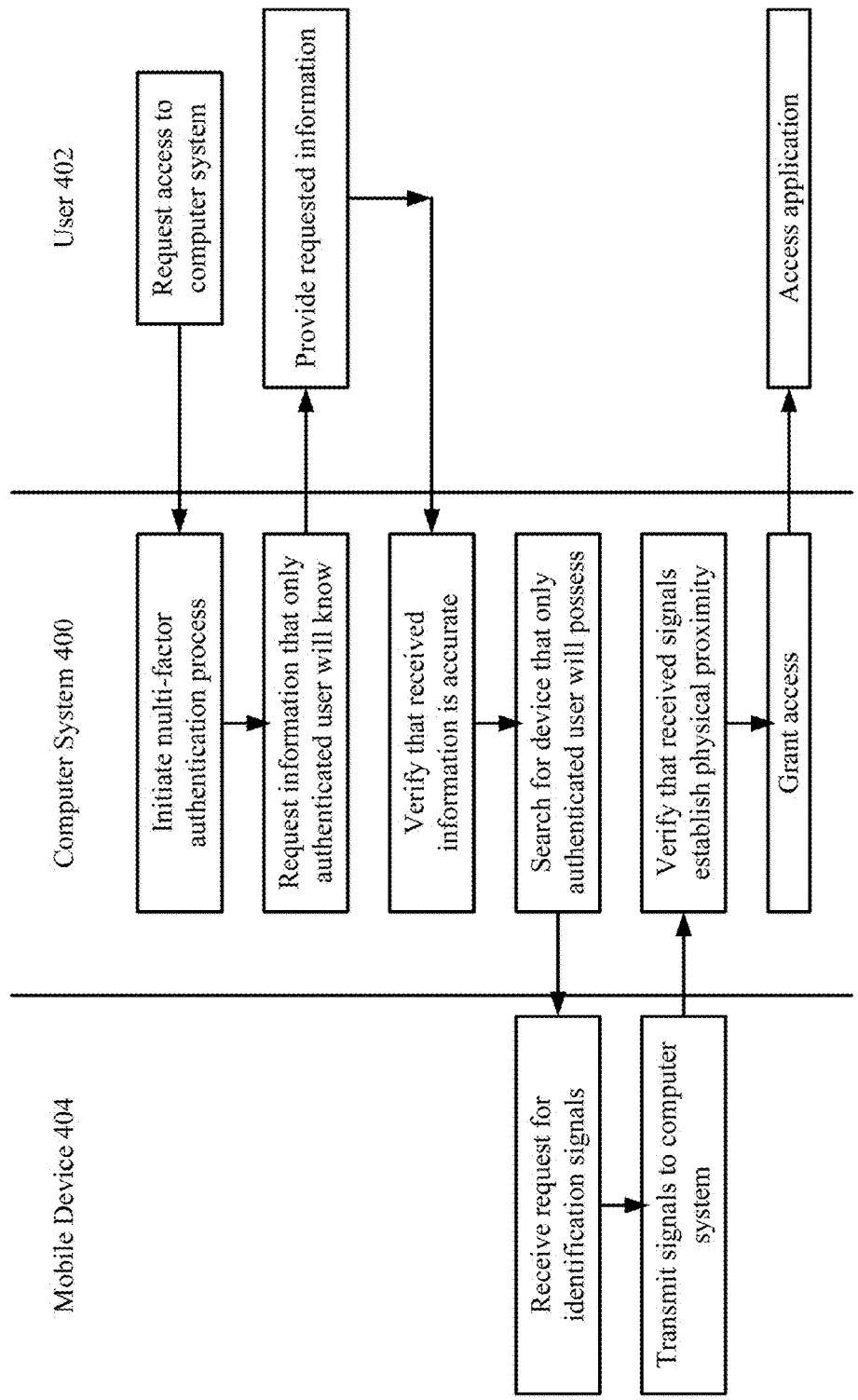
FIG. 4 illustrates operations performed in a multi-factor authentication process.

FIG. 4 illustrates operations performed in a multi-factor authentication process. A user 402 requests access to a computer system 400. In response, the computer system 400 initiates a multi-factor authentication process. Initially, the computer system 400 requests information that only an authenticated user will know. The user 402 provides information in response to the request. When the computer system 400 verifies that the received information is accurate, the computer system 400 determines that a first authentication factor was successfully completed.

The computer system 400 searches for a device (mobile device 404, in this example) that only an authenticated user will possess. When the mobile device 404 is proximate to the computer system 400, the device 404 receives the request for identification signals from the computer system 400. In some implementations, upon receiving the request, one or more processors included in the mobile device 404 can execute computer software applications stored on a computer-readable storage medium included in the device 404 to execute a computer software application.

In response to receiving the request, the application can present a notification indicating receipt of the request. For example, the application can display a message on a display screen of the mobile device 404, execute an instruction to emit a sound or to vibrate or combinations of them. Such a notification may alert the user 402 that the mobile device 404 has received a request from the computer system 400. Alternatively, such notification may not be necessary. Instead, the application may cause the mobile device 404 to transmit signals to the computer system 400 in response to receiving the request.

The computer system 400 receives the signals that the mobile device 404 transmits, and verifies that the received signals establish that the mobile device 404 is in physical proximity to the computer system 400. In this manner, when the computer system 400 verifies that the mobile device 404 is proximate to the computer system, the system 400 authenticates the user 402 and grants access. The authenticated user 402 can then access one or more applications executed by the computer system 400.

In some implementations, the computer system can first implement the authentication factor that is based on possession of the mobile device, and then implement the authentication factor based on knowledge of the password. In such implementations, the computer system can first determine that the mobile device is proximate to the computer system. Then, the computer system can display the user interface in the display device of the computer system, and request that the user provide the user identifier and password. If the computer system determines that the mobile device is not proximate to the computer system by implementing the techniques described above, the computer system can deny the user access to the computer system and not display the user interface. Alternatively, the computer system can implement an additional authentication factor as described above, and display the user interface if the user successfully completes the additional authentication factor.

In some implementations, the computer system can be a node of a centralized network and can be coupled to a centralized server. The user may be authorized to access the centralized server only through the computer system. In such implementations, the server can store an association between the computer system and the mobile device. When the user attempts to access the network, the server can implement the authentication factors described above to determine that the user is attempting to do so through the computer system.

In some situations, the mobile device can be associated with more than one computer system to access the centralized server. Conversely, more than one mobile device can be associated with the computer system to access the computer system or the server or both.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal, which is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources. For example, the mobile device can include one or more computer-readable storage devices that store the computer software instructions. The mobile device can further include one or more data processing apparatuses that can read the computer software instructions from the computer-readable storage devices and execute them.

The term "data processing apparatus" encompasses all kinds of apparatus, devices, and machines for processing data, including by way of example a programmable processor, a computer, a system on a chip, or multiple ones, or combinations, of the them. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file, in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks.

However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few.

Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and SD cards, CD-ROM and DVD-ROM disks. The processor and the memory can be supplemented by, or incorporated in, special purpose logic circuitry.

While this specification contains many specific implementation details, these should not be construed as limitations on the scope of any disclosures or of what can be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method comprising:
   determining that a user has successfully completed an authentication factor;
   determining whether a mobile device associated with the user is proximate to a computer, the determining comprising:
   receiving first wireless triangulation position data corresponding to a mobile device position;
   receiving second wireless triangulation position data corresponding to a computer position;
   determining, based on the first wireless triangulation position data and the second wireless triangulation position data, a distance between the mobile device position and the computer position;
   determining the mobile device is proximate the computer by determining the distance between the mobile device position and the computer position does not exceed a maximum threshold; and
   authenticating, by one or more computers, the user based on determining that the user has successfully completed the authentication factor and that the mobile device is proximate to the computer.

2. The method of claim 1, wherein determining that the mobile device associated with the user is proximate to the computer further comprises determining the existence of a connection between the mobile device and the computer.

3. The method of claim 1, further comprising:
   determining, in response to determining that the mobile device is not proximate to the computer by determining that the distance between the mobile device position and the computer position exceeds the maximum threshold, that the user has successfully completed an additional authentication factor; and
   authenticating the user based on determining that the user has successfully completed both the authentication factor and the additional authentication factor.

4. The method of claim 1, wherein determining that the user has successfully completed the authentication factor comprises determining that the user has successfully completed an authentication factor for gaining access to a computer software application executing on the computer.

5. The method of claim 1, wherein the computer comprises a node of a centralized network and wherein determining that the user has successfully completed the authentication factor comprises determining that the user has successfully completed an authentication factor through interaction with the node.

6. The method of claim 1, further comprising associating, prior to determining whether the mobile device associated with the user is proximate to the computer, the mobile device with the user, the association formed through user interaction with the mobile device.

7. The method of claim 1, further comprising associating, prior to determining whether the mobile device associated with the user is proximate to the computer, the mobile device with the user, the association formed through user interaction with the computer.

8. The method of claim 1, further comprising:
determining that the mobile device can no longer be used to authenticate any user prior to determining whether the mobile device associated with the user is proximate to the computer; and
eliminating an association between the mobile device and the user.

9. The method of claim 1, wherein the mobile device and the computer are connected to a same wireless network.

10. The method of claim 1, wherein determining the mobile device position and determining the computer position are determined within a resolution of one foot or less of an actual mobile device position or an actual computer position, respectively.

11. The method of claim 1, further comprising:
transmitting the first wireless triangulation position data and the second wireless triangulation position data; and
receiving the distance between the mobile device position and the computer position.

12. The method of claim 11, further comprising receiving an indication the mobile device is proximate the computer based on a determination the distance between the mobile device position and the computer position does not exceed the maximum threshold.

13. A computer-readable storage medium storing computer software instructions executable by one or more data processing apparatus which, upon such execution, cause the one or more data processing apparatus to perform operations comprising:
determining that a user has successfully completed an authentication factor;
determining whether a mobile device associated with the user is proximate to a computer, the determining comprising:
receiving first wireless triangulation position data corresponding to a mobile device position;
receiving second wireless triangulation position data corresponding to a computer position;
determining, based on the first wireless triangulation position data and the second wireless triangulation position data, a distance between the mobile device position and the computer position;
determining the mobile device is proximate the computer by determining the distance between the mobile device position and the computer position does not exceed a maximum threshold; and
authenticating the user based on determining that the user has successfully completed the authentication factor and that the mobile device is proximate to the computer.

14. The medium of claim 13, wherein determining that the mobile device associated with the user is proximate to the computer further comprises determining the existence of a wireless connection between the mobile device and the computer.

15. The medium of claim 13, the operations further comprising:
determining, in response to determining that the mobile device is not proximate to the computer, that the user has successfully completed an additional authentication factor; and
authenticating the user based on determining that the user has successfully completed both the authentication factor and the additional authentication factor.

16. The medium of claim 13, wherein the computer comprises a node of a centralized network and wherein determining that the user has successfully completed the authentication factor comprises determining that the user has successfully completed an authentication factor through interaction with the node.

17. The medium of claim 13, the operations further comprising associating, prior to determining whether the mobile device associated with the user is proximate to the computer, the mobile device with the user, the association formed through user interaction with the mobile device.

18. The medium of claim 13, the operations further comprising associating, prior to determining whether the mobile device associated with the user is proximate to the computer, the mobile device with the user, the association formed through user interaction with the computer.

19. The medium of claim 13, the operations further comprising:
determining that the mobile device can no longer be used to authenticate any user prior to determining whether the mobile device associated with the user is proximate to the computer; and
eliminating an association between the mobile device and the user.

20. A system comprising:
one or more computers; and
a computer-readable storage medium storing computer software instructions executable by the one or more computers which, upon such execution, cause the one or more computers to perform operations comprising:
determining that a user has successfully completed an authentication factor;
determining whether a mobile device associated with the user is proximate to a computer, the determining comprising:
receiving first wireless triangulation position data corresponding to a mobile device position;
receiving second wireless triangulation position data corresponding to a computer position;
determining, based on the first wireless triangulation position data and the second wireless triangulation position data, a distance between the mobile device position and the computer position;
determining the mobile device is proximate the computer by determining the distance between the mobile device position and the computer position does not exceed a maximum threshold; and
authenticating the user based on determining that the user has successfully completed the authentication factor and that the mobile device is proximate to the computer.

* * * * *